US011996707B2

United States Patent
Shi et al.

(10) Patent No.: US 11,996,707 B2
(45) Date of Patent: May 28, 2024

(54) WIRELESS POWER TRANSFER POWER CONTROL TECHNIQUES

(71) Applicant: Apple Inc., Cupertino, CA (US)

(72) Inventors: Lixin Shi, Redwood City, CA (US); Zaki Moussaoui, San Carlos, CA (US); Weihong Qiu, San Ramon, CA (US); Zelin Xu, San Jose, CA (US); Matthew J Chabalko, Salinas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/816,081

(22) Filed: Jul. 29, 2022

(65) Prior Publication Data

US 2023/0100393 A1 Mar. 30, 2023

Related U.S. Application Data

(60) Provisional application No. 63/261,485, filed on Sep. 22, 2021.

(51) Int. Cl.
*H02J 50/80* (2016.01)
*H02J 50/10* (2016.01)
*H02J 50/40* (2016.01)

(52) U.S. Cl.
CPC .............. *H02J 50/80* (2016.02); *H02J 50/10* (2016.02); *H02J 50/40* (2016.02)

(58) Field of Classification Search
CPC .. H02J 50/10; H02J 50/40; H02J 50/80; H02J 7/0049; H02J 7/00034; H02J 7/00711
See application file for complete search history.

(56) References Cited

U.S. PATENT DOCUMENTS

| | | | |
|---|---|---|---|
| 10,637,294 B2 | 4/2020 | Sarwat et al. | |
| 2011/0181119 A1* | 7/2011 | Ishibashi | H02J 50/12 307/104 |
| 2012/0056485 A1 | 3/2012 | Haruyama | |
| 2013/0043735 A1* | 2/2013 | Low | H04B 5/0031 307/104 |
| 2013/0099585 A1 | 4/2013 | Von Novak et al. | |
| 2014/0346887 A1 | 11/2014 | Bhamidipati et al. | |
| 2017/0047784 A1* | 2/2017 | Jung | G06F 1/206 |

(Continued)

FOREIGN PATENT DOCUMENTS

KR 20200077082 A 6/2020

OTHER PUBLICATIONS

U.S. Appl. No. 63/216,831, filed Jun. 30, 2021, Ye Li.
Office Action for U.S. Appl. No. 17/386,542 dated Jun. 22, 2023; 17 pgs.

*Primary Examiner* — Jeffrey M Shin
(74) *Attorney, Agent, or Firm* — FLETCHER YODER PC

(57) ABSTRACT

A wireless power transfer system can include an electronic device including a first wireless power transfer coil and wireless power transfer circuitry coupled to the wireless power transfer coil. The wireless power transfer circuitry can be capable of receiving power and transmitting power wirelessly via the first wireless power transfer coil. The system can further include an accessory device including a second wireless power transfer coil, a rectifier coupled to the second wireless power transfer coil, and an energy storage device coupled to the rectifier by a regulator circuit. The wireless power transfer circuitry can operate in a pulsed or burst wireless power transfer mode to deliver power to the accessory device.

18 Claims, 7 Drawing Sheets

(56) References Cited

U.S. PATENT DOCUMENTS

| | | |
|---|---|---|
| 2017/0240056 A1 | 8/2017 | Elshaer et al. |
| 2017/0281944 A1 | 10/2017 | Khalil et al. |
| 2018/0102813 A1 | 4/2018 | Ko |
| 2018/0131242 A1 | 5/2018 | Louis |
| 2018/0294674 A1 | 10/2018 | Choi et al. |
| 2019/0022394 A1 | 1/2019 | Fayram et al. |
| 2019/0089171 A1 | 3/2019 | Fischer et al. |
| 2020/0266665 A1* | 8/2020 | Noh .................. H02J 50/005 |
| 2021/0091591 A1 | 3/2021 | Brelivit et al. |
| 2021/0194289 A1 | 6/2021 | Schulzetenberg et al. |
| 2022/0103015 A1 | 3/2022 | Nussbaum et al. |

\* cited by examiner

WIRELESS POWER TRANSFER POWER CONTROL TECHNIQUES

CROSS-REFERENCE TO RELATED APPLICATION

This application claims the benefit of U.S. Provisional Application No. 63/261,485, filed Sep. 22, 2021, entitled "WIRELESS POWER TRANSFER POWER CONTROL TECHNIQUES," the disclosure of which is incorporated by reference in its entirety for all purposes.

BACKGROUND

Wireless power transfer, in which power is delivered via inductive coupling between a power transmitter (PTx) and a power receiver (PRx), is useful for powering battery powered electronic devices. In some applications, intermittent wireless power transfer (e.g., "burst mode" wireless power transfer) may be used to enhance operating efficiency.

SUMMARY

To optimize intermittent wireless power transmission while also ensuring adequate power delivery to all relevant devices, control techniques may be adapted to account for powered accessories.

A wireless power transfer system can include an electronic device including a first wireless power transfer coil and wireless power transfer circuitry coupled to the wireless power transfer coil. The wireless power transfer circuitry can be capable of receiving power and transmitting power wirelessly via the first wireless power transfer coil. The system can further include an accessory device including a second wireless power transfer coil, a rectifier coupled to the second wireless power transfer coil, and an energy storage device coupled to the rectifier by a regulator circuit. The wireless power transfer circuitry can operate in a pulsed or burst wireless power transfer mode to deliver power to the accessory device.

The pulsed or burst wireless power transfer mode can have an on time during which power is delivered to the accessory device and an off time during which power is not delivered to the accessory device. The wireless power transfer circuitry can employ a variable on time, wherein the on time is terminated in response to the wireless power transfer circuitry detecting that the energy storage device is fully charged. The wireless power transfer circuitry can detect that the energy storage device is fully charged by monitoring an amount of wireless power delivered to the accessory device. The wireless power transfer circuitry can operate in the pulsed or burst wireless power transfer mode using a constant off time. The constant off time can be determined by the electronic device responsive to information received from the accessory device relating to power consumption of the accessory device. The information received from the accessory device can be received via a communication channel separate from the wireless power transfer channel. The wireless power transfer circuitry can operate in the pulsed or burst wireless power transfer mode using a variable off time. The variable off time can be terminated by a burst mode request pulse from the accessory device.

The wireless power transfer system can further include a power accessory having a third wireless power transfer coil, the power accessory also receiving power from the electronic device, with the second wireless power transfer coil of the accessory device being positioned between the first wireless power transfer coil of the electronic device and the third wireless power transfer coil of the power accessory. The power accessory can be capable of delivering power to the electronic device and the accessory device via the third wireless power transfer coil.

An electronic device can include a wireless power transfer coil and wireless power transfer circuitry coupled to the wireless power transfer coil. The wireless power transfer circuitry can be capable of receiving power and transmitting power wirelessly via the first wireless power transfer coil. The wireless power transfer circuitry can operate in a pulsed or burst wireless power transfer mode to deliver power wirelessly to an accessory device. The pulsed or burst wireless power transfer mode can have an on time during which power is delivered to the accessory device and an off time during which power is not delivered to the accessory device.

The wireless power transfer circuitry can employ a variable on time. The on time can be terminated in response to the wireless power transfer circuitry detecting a decrease in power delivered to the accessory device. The decrease in power delivered to the accessory devices can be associated with an energy storage device of the accessory device reaching a full charge state. The wireless power transfer circuitry can operate in the pulsed or burst wireless power transfer mode using a constant off time. The constant off time can be determined by the electronic device responsive to information received from the accessory device relating to power consumption of the accessory device. The information received from the accessory device can be received via a communication channel separate from the wireless power transfer channel. The wireless power transfer circuitry can operate in the pulsed or burst wireless power transfer mode using a variable off time. The variable off time can be terminated by a burst mode request pulse from the accessory device.

A method of operating a wireless power transmitter to provide pulsed or burst mode power to an accessory device can include initiating a power transfer interval during which wireless power transfer circuitry of the wireless power transmitter is operated to deliver power to the accessory device. The method can further include, upon expiration of an on time, terminating the power transfer interval by ceasing operation of the wireless power transfer circuitry, thereby initiating a sleep mode having an off time during which the wireless power transfer circuitry is not operated. The method can further include upon expiration of an off time, terminating the sleep mode by initiating a subsequent power transfer interval.

The on time can be variable and can be terminated in response to the wireless power transmitter detecting a decrease in power delivered to the accessory device. The decrease in power delivered to the accessory devices can be associated with an energy storage device of the accessory device reaching a full charge state. The off time can be constant. The constant off time can be determined by the wireless power transmitter responsive to information received from the accessory device relating to power consumption of the accessory device. The off time can be variable. The variable off time is terminated by a burst mode request pulse from the accessory device.

DETAILED DESCRIPTION

Figure 1:
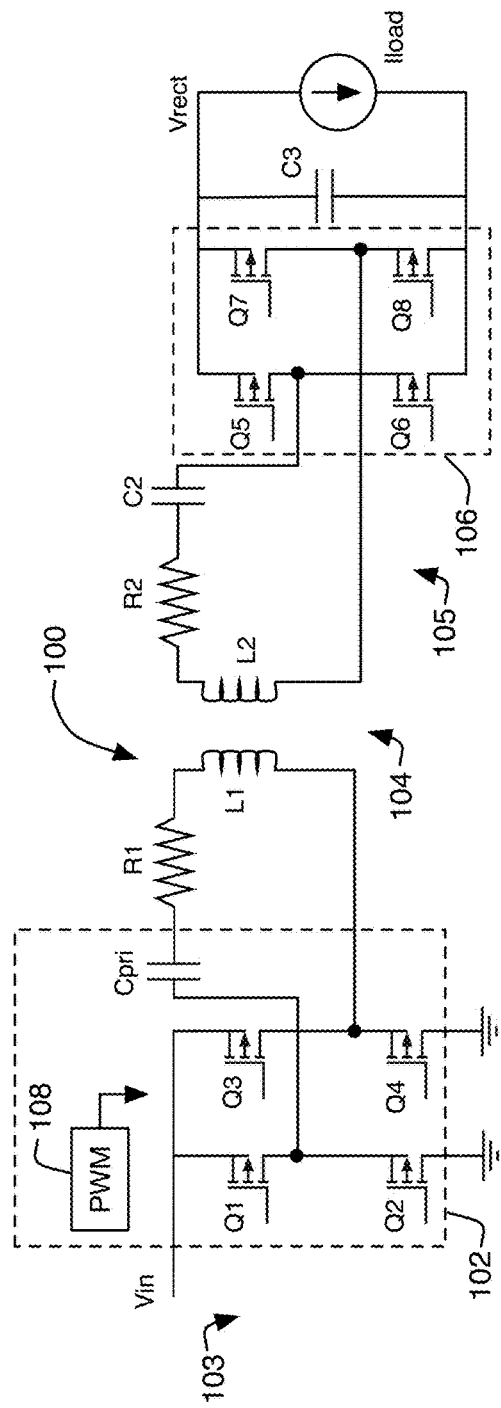
FIG. 1 illustrates a high-level schematic of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a high-level schematic of a wireless power transfer system 100. The left side of the figure illustrates a power transmitter (PTx) 103, which receives an input voltage Vin and transmits energy to a receiver via magnetic induction, i.e., by coupling between transmit and receive coils represented by inductors L1 and L2, respectively. (Each coil/inductor also has a corresponding intrinsic/parasitic resistance: R1/R2. These are illustrated in the schematic of FIG. 1 but are not separate physical components.) The right side of the figure depicts a power receiver (PRx) 105 that receives power via the inductive coupling and delivers power to a load depicted by current source Iload. An input voltage Vin is supplied to inverter 102. Inverter 102 generates an AC output having a predetermined frequency and a magnitude that is determined by input voltage Vin, which may be regulated by a separate regulator (not shown). This AC output voltage of inverter 102 is provided the transmit coil, represented by inductor L1, which is magnetically coupled a corresponding receive coil, represented by inductor L2. This results in energy transfer to the PRx 105. PRx 105 includes a receive coil, represented by inductor L2, which has a voltage induced therein by magnetic induction via transmit coil L1. This AC voltage may be provided to a rectifier 106, discussed in greater detail below, that converts the received AC voltage to an output DC voltage (Vrect) that may be supplied to a load. The wireless power transfer system 100 may include additional components, such as transmitter tuning capacitor Cpri and receiver tuning capacitor C2 that may be used to tune the resonant frequency of the transmit and receive circuits to improve operating efficiency of the system.

In the illustrated embodiment, inverter 102 is a full bridge inverter made up of four switching devices Q1-Q4, although other inverter topologies could be used as appropriate for a given application. Also depicted at a high level is PWM controller 108, which provides pulse width modulation signals to the switching devices Q1-Q4 to generate a desired output voltage and/or current. These switching devices are illustrated as MOSFETs (metal-oxide-semiconductor field effect transistors), though other types switching devices (including, for example, IGBTs (insulated gate bipolar transistors), junction field effect transistors (JFETs), etc. could be used as appropriate for a given embodiment. Likewise, any suitable semiconductor technology, such as silicon, silicon carbide (SiC), gallium nitride (GaN), could be used depending on the specific application. The same applies to all other switching devices (including diodes) discussed in the present application. Switching devices Q1-Q4 may be alternately switched to connect an input DC voltage (e.g., from boost regulator 108) to the transmit winding L1, producing an AC voltage that may be coupled to the PRx as described above.

Operation of inverter 102 will induce an AC voltage in inductively coupled PRx receiver coil L2. This AC voltage may be coupled to a rectifier 106. In the illustrated embodiment, rectifier 106 is a full bridge active rectifier made up of four switches Q5-Q7. Although illustrated as MOSFET switches, other rectifier types, constructed using any suitable semiconductor technology, could also be used. These alternative configurations can provide for increased operating efficiency in some applications.

Operating a wireless power transfer system intermittently, e.g., in a burst mode, can address inefficiencies associated with at the system under certain loading conditions. In burst mode, power is transmitted in short bursts instead of continuously. Thus, a burst can include one or more AC pulses from the inverter. Following the one or more burst pulses, there may be an intervening time period during which no AC power is transmitted. This intervening time period may then be followed by another burst of one or more AC pulses. This can mitigate light load inefficiencies by decreasing switching losses and quiescent current losses. Additionally, carefully controlled use of burst mode can allow the system to effectively be loaded at its optimum output resistance, thus allowing the AC/AC system to be operated at or near its peak efficiency, regardless of actual output power. Finally, the use of burst mode can be used to control the voltage gain of the system, i.e., the ratio of the output voltage Vrect to the input voltage Vin.

Figure 2:
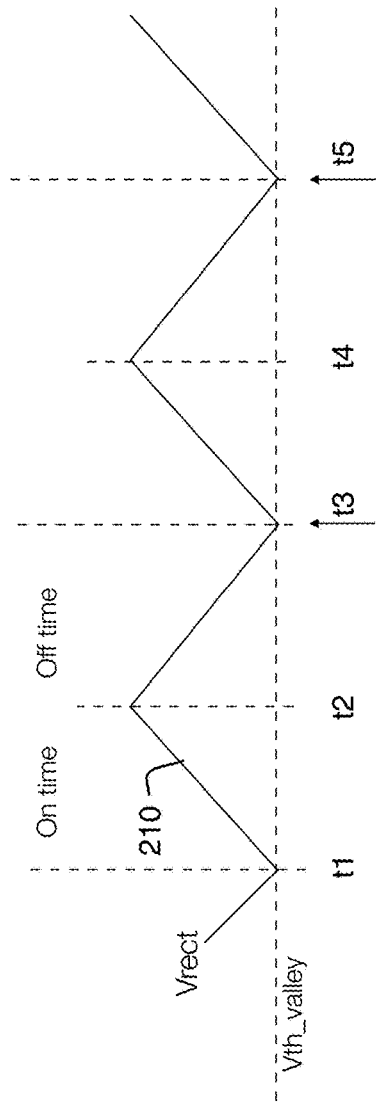
FIG. 2 illustrates burst mode operation of a WPT system, showing the rectifier output voltage.

FIG. 2 shows burst mode operation, with the switching on and off times and showing the rectifier output voltage 210. Beginning, for example, at time t1, an on time of the inverter may begin. In some applications, this operation may be triggered by a burst mode request pulse from the receiver. In other applications, the operation may be initiated by other triggers, some examples of which are described herein. During this on time, switching on the inverter side may transfer power to the receiver side, causing the rectifier voltage Vrect to increase to a peak value at time t2, corresponding to when the burst is terminated, i.e., the inverter stops switching. Then, during the off time (from t2 to t3), when the inverter is not switching, the rectifier voltage Vrect may decrease to a valley threshold (Vth_valley). In some applications, this can cause the receiver to send another burst mode request pulse at time t3, repeating the cycle. In other applications, the duration of the off time may be determined by other mechanisms.

In an exemplary implementation of burst mode wireless power transfer, the power receiving device can communicate to the power transmitting device that power is required by initiating a burst mode request pulse. This pulse may be created by the receiver by using the rectifier switches to apply a predetermined switching pattern, sequence, or state to the receiver coil. This predetermined switching pattern, sequence, or state alters the reflected impedance magnetically coupled via the transmitter and receiver windings to the power transmitter/inverter. Upon detection of this pulse, the transmitter/inverter initiates a burst of pulses as described above. Exemplary implementations of burst mode control circuitry are disclosed in Applicant's co-pending U.S. patent application Ser. No. 17/386,542, entitled "Efficient Wireless Power Transfer Control," filed Jul. 28, 2021 and 63/216,831, entitled "Wireless Power Transfer with Integrated Communications," filed Jun. 30, 2021, which are incorporated by reference in their entirety.

Figure 3A:
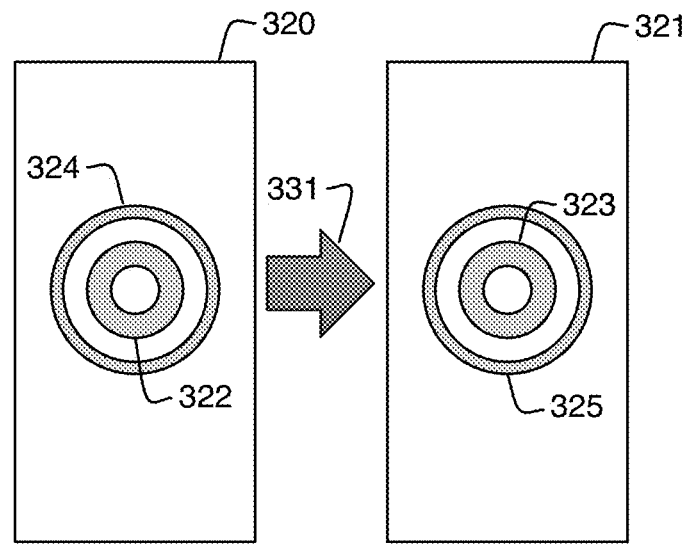
FIGS. 3A and 3B illustrate a personal electronic device, in the form of a mobile phone, together with a wirelessly powered accessory, in the form of a case, together with a wireless charger.
Figure 3B:
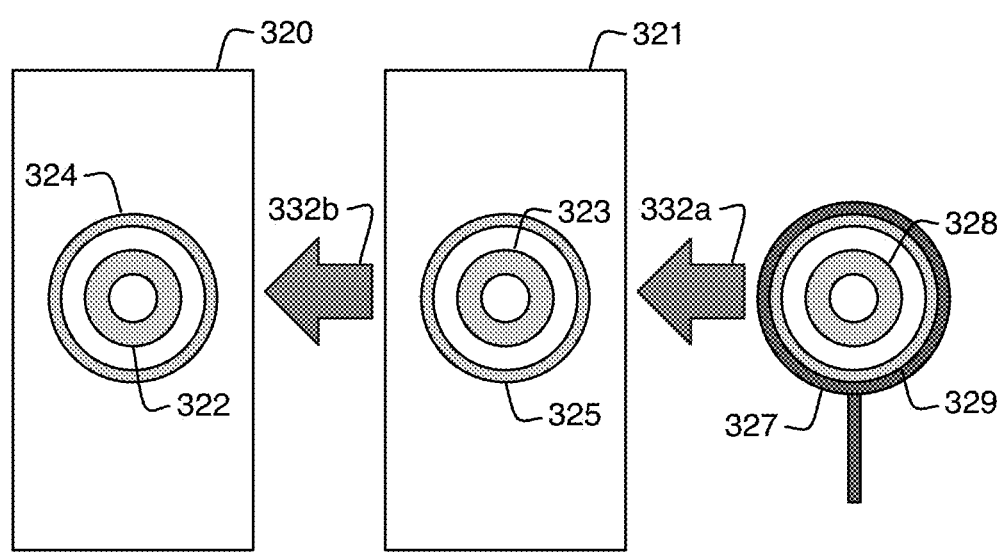

FIGS. 3A and 3B illustrate a personal electronic device 320, in the form of a mobile phone, together with a wirelessly powered accessory 321, in the form of a case, together with a wireless charger 327. Although the given example includes a mobile phone and a case, personal electronic device, and wirelessly powered accessory 321 could be any of a variety of devices, and the example of a phone and case is provided as one example context and should not be construed as the only context in which the teachings herein are applicable. Personal electronic device 320 can be configured to allow for wireless power transfer, including charging of an internal battery of personal electronic device 320 and also optionally including wireless delivery of power to accessory device 321. To facilitate such wireless power transfer, personal electronic device 320 may include a wireless power transfer coil 322. Personal electronic device 320 may also include a magnet array 324, which may include a plurality of magnets arranged in a suitable configuration to aid in positioning an accessory and/or charger. Although illustrated in a ring configuration, the locating magnets may be disposed in any desired configuration and may include any number of magnets. Alternatively, other positioning aids or no positioning aids could be provided as appropriate for a particular application.

Wirelessly powered accessory 321 may include a wireless power transfer coil 323 (corresponding to wireless power transfer coil 322) and magnet array 325 (corresponding to magnet array 324). Wireless power transfer coil 321 can facilitate wireless power transfer 331 with personal electronic device 320 in either direction (i.e., transferring power either to or from personal electronic device 320). Likewise, magnet array 325 can cooperate with magnet array 324 to suitably position personal electronic device 320 relative to accessory 321 as desired. Or, as noted above, other positioning aids or no positioning aids could also be used. Accessory device 321 may also include other components necessary for the accessory to function. For example, wirelessly powered accessory 321 could be a battery case, in which additional battery capacity for personal electronic device 320 can be provided via wireless power transfer, or the battery case can be charged by personal electronic device 320.

FIG. 3B illustrates the above-described personal electronic device 320 and wirelessly powered accessory 321 with an additional wireless charger 327. Wireless charger 327 may also have a wireless power transfer coil 328 corresponding to wireless power transfer coils 322 and 323, allowing for charger 327 to deliver power 332a and 332b to wirelessly powered accessory 321 and personal electronic device 320, respectively. In this configuration, wireless power transfer may be thought of as occurring between charger 327 and personal electronic device 320, with wirelessly powered accessory 321 acting to intercept a portion of the power delivered. Further details of such configurations are described below with respect to FIGS. 5A-5C.

Figure 4:
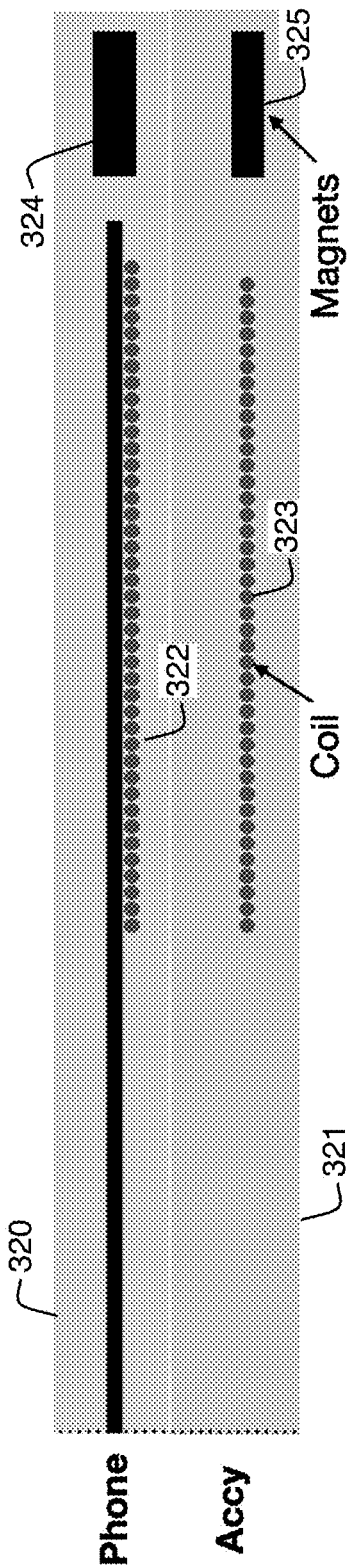
FIG. 4 illustrates a cross-section of a personal electronic device, in the form of a mobile phone, together with a wirelessly powered accessory, in the form of a case.

FIG. 4 illustrates a simplified cross-section of a personal electronic device 320, in the form of a mobile phone, together with a wirelessly powered accessory 321, in the form of a case. Also depicted in FIG. 4 are wireless power transfer coil 322 and magnet 324 of personal electronic device 320, together with wireless power transfer coil 323 and magnet 325 of wirelessly powered accessory 321. The cross-sectional view of FIG. 4 illustrates the relative positioning of such components in a typical usage configuration.

Figure 5A:
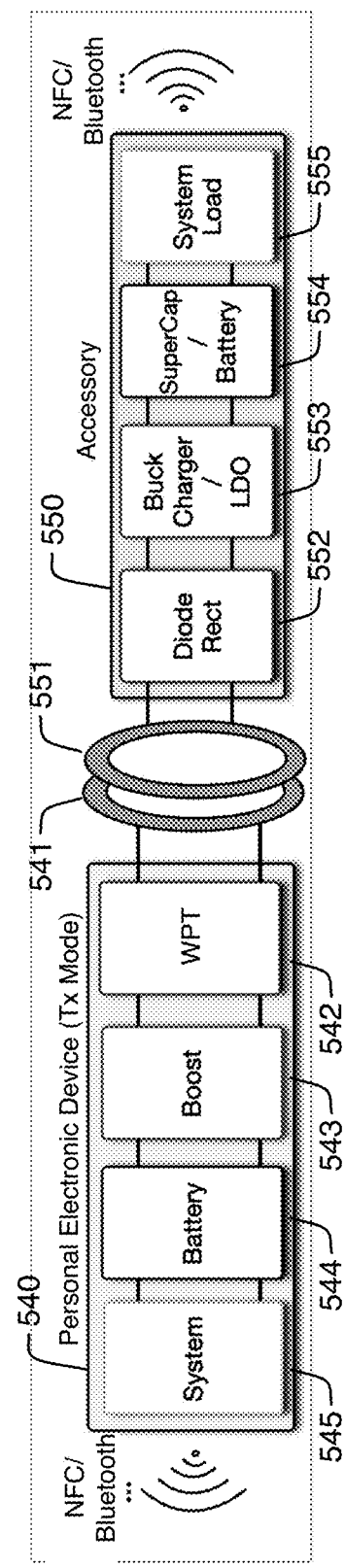
FIGS. 5A-5C are block diagrams illustrating various use cases of a personal electronic device, a wirelessly powered accessory, and a power accessory that can wirelessly charge or be charged by the personal electronic device.
Figure 5B:
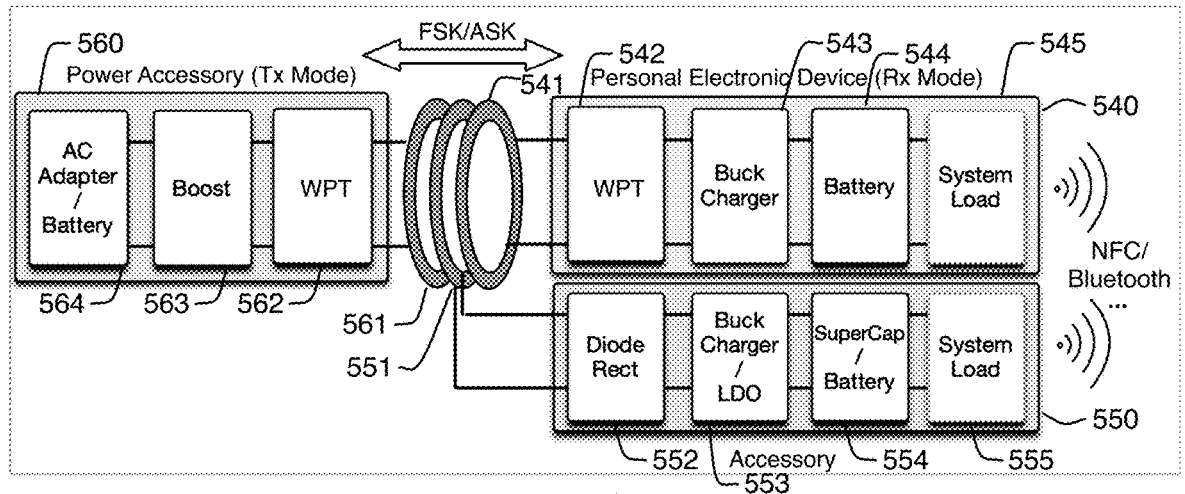
Figure 5C:
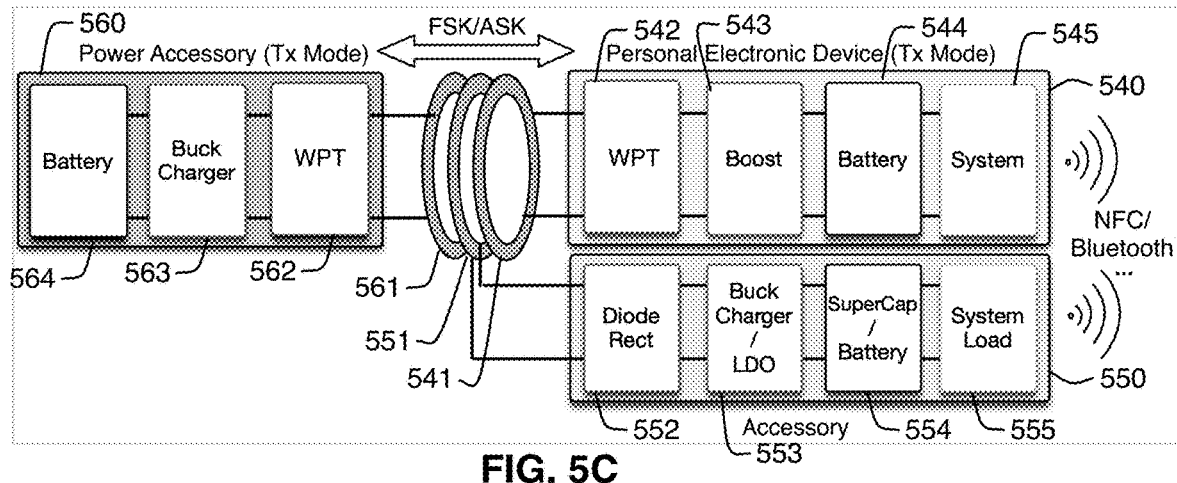

FIGS. 5A-5C are block diagrams illustrating various use cases of a personal electronic device 540, an accessory 550, and a power accessory 560 that can wirelessly charge or be charged by the personal electronic device. As described above, personal electronic device 540 may be a mobile phone, but could also be any other device, such as a tablet, laptop, or notebook computer, Accessory 550 could be any device intended to be: (a) powered by personal electronic device 540 (as described below with reference to FIG. 5A) or; (b) to receive power from power accessory 560 when power accessory 560 is powering personal electronic device 540 (as described below with reference to FIG. 5B) or; (c) to receive power from personal electronic device 540 when electronic device 540 is powering power accessory 560 (as described below with reference to FIG. 5C).

FIG. 5A illustrates an example configuration in which a personal electronic device 540 acts in a power transmitter mode to wirelessly power an accessory 550. Personal electronic device 540 can include a battery 544, that may be used to power both personal electronic device 540 itself and accessory 550 via wireless power transfer. Personal electronic device 540 can further include a system 545 powered by battery 544 (via an intermediate power management unit and/or regulator, not shown). System 545 can include any of a variety of multiple subsystems, such as processing subsystems, input/output subsystems, communications subsystems, storage subsystems, and the like. In some embodiments, system 545 can include communications subsystems, for example a NFC/Bluetooth communications system that can be used to communicate with an accessory 550. Battery 544 may also supply power to a wireless power transfer module 542. This may occur via an optional intermediate regulator 543, which can be, for example, a boost converter. This presupposes that, as is commonly the case, the voltage needed by wireless power transfer module 542 is greater than the minimum battery voltage. However, in some applications, boost converter 543 could be replaced with any suitable switching or linear regulator. Wireless power transfer module 542 can drive a wireless power transfer coil 541 to deliver power wirelessly to accessory 550.

Accessory 550 can include wireless power transfer coil 541 that can receive power from personal electronic device 540 (or any other compatible wireless power transfer device). The AC voltage induced by such wireless power transfer may be converted to DC by a rectifier 552, which can be a diode rectifier or an active rectifier made up of suitable switching devices. The DC voltage resulting from such rectification can be provided to a charger circuit 553 that can deliver power to an energy storage device 554, such as a supercapacitor or battery. In some applications, charger circuit 553 can be a buck charger or low dropout regulator. In other applications, any suitable switching or linear regulator could be used, including regulators that increase the rectified DC voltage to a higher level, if appropriate for a given application. Finally, energy storage device 554 can be used to power a system load 555 of accessory 550, which may include any of a variety of subsystems, including processing subsystems, input/output subsystems, communications subsystems, storage subsystems, and the like. In some embodiments, system 555 can include communications subsystems, for example an NFC/Bluetooth communications system that can be used to communicate with an personal electronic device 540.

As noted above, in the configuration of FIG. 5A, personal electronic device 540 can act as a wireless power transmitter to power accessory 550, which acts as a wireless power receiver. To improve operating efficiency, accessory 550 may employ a pulsed or burst mode charging operation, as described in greater detail below. To briefly summarize, in the pulsed or burst mode charging, accessory 550 periodically draws pulses or bursts of power from personal electronic device 540 to charge energy storage device 554 and power system load 555. In between these pulses or bursts, system load 555 discharges energy storage device 554.

FIG. 5B illustrates an example configuration in which a power accessory 560 acts in a power transmitter mode to wirelessly power a personal electronic device 540 that acts in a power receiver mode. Additionally illustrated in FIG. 5B is an accessory 550 that is arranged to take power from the transfer between power accessory 560 and personal electronic device 540. Power accessory 560 can include a power source 564, which may be an AC adapter (for receiving mains power) or a battery (a source of DC power). This power source may be coupled to wireless power transfer circuitry 562 via an optional intermediate regulator 563. Regulator 563 may, in some applications, be a boost converter that increases the voltage from power source 564 to a level needed by wireless power transfer circuitry 562. However, in other applications, regulator 563 could be any suitable form of switching or linear regulator. The regulated voltage output of regulator 563 may be delivered to wireless power transfer circuitry 562, which can drive wireless power transfer coil 561 to deliver power wirelessly to personal electronic device 540, which includes wireless power transfer coil 541, and accessory 550, which includes wireless power transfer coil 551.

Wireless power transfer circuitry 562 may also include in-band communications circuitry configured to allow for communications with corresponding circuitry in personal electronic device 540, e.g., in wireless power transfer circuitry 542, using modulation of the voltage, current, and/or power wirelessly transferred. For example, the in-band communications circuitry may be configured to employ frequency shift keyed communications, amplitude shift keyed communications, or any other suitable in-band communications technique.

Personal electronic device 540 includes the various components described above with respect to FIG. 5A. In the configuration of FIG. 5B, wireless power transfer circuitry 542 acts as a wireless power receiver. Likewise, regulator 543 may operate as a buck regulator to charge battery 544 rather than as a boost regulator as described above with respect to FIG. 5A. Regulator 543 may thus be a bidirectional buck/boost regulator (or any other suitable regulator configuration). In the receiver mode, an AC voltage is induced in wireless power transfer coil 541 by operation of wireless power transfer circuitry 562 and wireless power transfer coil 561 of power accessory 560. This induced voltage is rectified by wireless power transfer circuitry 542 and provided to regulator 543 which can charge battery 544 that in turn powers system load 545 as described above. Wireless power transfer circuitry 542 may also include in-band communications circuitry configured to allow for communications with corresponding circuitry in power accessory 560, e.g., in wireless power transfer circuitry 562, using modulation of the voltage, current, and/or power wirelessly transferred. For example, the in-band communications circuitry may be configured to employ frequency shift keyed communications, amplitude shift keyed communications, or any other suitable in-band communications technique.

Additionally, accessory 553 includes the various components described above with respect to FIG. 5A. Additionally, these components operate as described above, including a pulsed or burst mode operation described in greater detail below. Wireless charging coil 551 of accessory 553 may be positioned with respect to wireless power transfer coil 561 of power accessory 560 and wireless power transfer coil 541 of personal electronic device 540 to take power from the power transfer stream between power accessory 560 and personal electronic device 540. As an example, accessory 550 may be positioned with respect to power accessory 560 and personal electronic device 540 so that its wireless power transfer coil 551 is disposed between the wireless power transfer coils 561 and 541 of power accessory 560 and personal electronic device 540, respectively.

FIG. 5C illustrates an example configuration in which a power accessory 560 acts in a power receiver mode to wirelessly receive power from a personal electronic device 540 that acts in a power transmitter mode. Additionally illustrated in FIG. 5C is an accessory 550 that is arranged to take power from the transfer between power accessory 560 and personal electronic device 540. Power accessory 560 includes the same components described above with respect to FIG. 5B, but is operated to receive power from, rather than deliver power to, personal electronic device 540. Thus, wireless power transfer circuitry 562 acts as a rectifier to rectify a voltage induced across wireless power transfer coil 561 by operation of personal electronic device 540 and wireless power transfer coil 541 as described above with respect to FIG. 5A. The rectified voltage is provided to regulator 563, which, in some applications, may operate as a buck charger to charge energy storage device/battery 564. Thus, in some embodiments, regulator 563 can be a bidirectional buck boost converter, although any suitable regulator type may be used in a given application. Additionally, as described above, WPT circuitry 562 can include in band communications circuitry that facilitates communication with corresponding circuitry in personal electronic device 540/wireless power transfer circuitry 542 as described above.

Personal electronic device 540 includes the components described above with respect to FIGS. 5A and 5B and operates as described with respect to FIG. 5A to deliver power to power accessory 560. Likewise, WPT circuitry 542 can include in band communications circuitry that facilitates communication with corresponding circuitry in power accessory 560 (e.g., wireless power transfer circuitry 562) as described above. Additionally, accessory 553 includes the various components described above with respect to FIGS. 5A and 5B. These components can operate as described above, including a pulsed or burst mode operation described in greater detail below. Wireless charging coil 551 of accessory 553 may be positioned with respect to wireless power transfer coil 561 of power accessory 560 and wireless power transfer coil 541 of personal electronic device 540 to take power from the power transfer stream between power accessory 560 and personal electronic device 540. As an example, accessory 550 may be positioned with respect to power accessory 560 and personal electronic device 540 so that its wireless power transfer coil 551 is disposed between the wireless power transfer coils 561 and 541 of power accessory 560 and personal electronic device 540, respectively.

Figure 6:
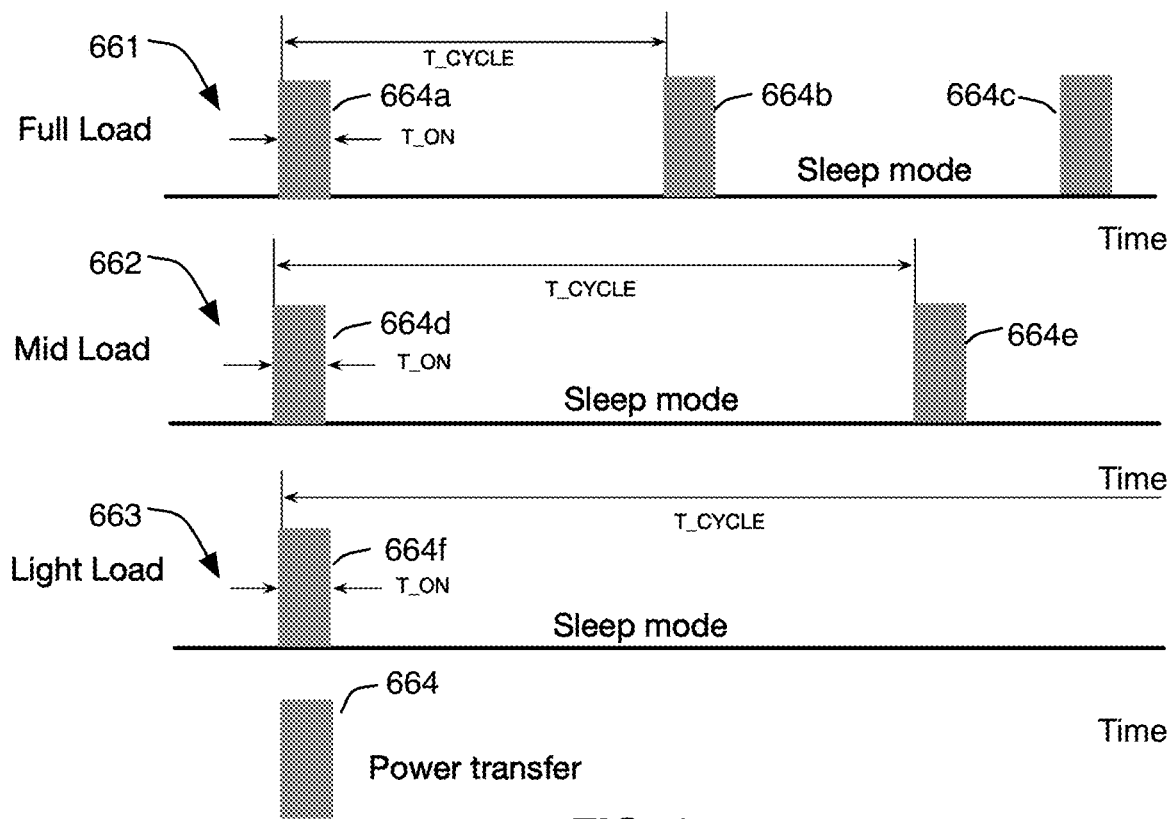
FIG. 6 illustrates simplified timing diagrams corresponding to a pulsed or burst mode wireless power transfer operation.

FIG. 6 illustrates simplified timing diagrams corresponding to a pulsed or burst mode wireless power transfer operation. Such a pulsed or burst mode wireless power transfer operation may be employed, for example, by accessory 550, which can intermittently charge energy storage device 554 (e.g., a battery or super capacitor) and intermittently allow system load 555 to discharge energy storage device 554. In FIG. 6, power transfer intervals 664 correspond to power transfer windows, during which rectifier 552 and regulator/charger/LDO 553 are operating to draw power via wireless power transfer coil 551 and store energy in energy storage device 554. Timing diagram 661 corresponds to a full load or high load condition for accessory 550. In this condition, power transfer intervals 664a, 664b, and 664c occur relatively frequently over time. In between these power transfer intervals 664 is a sleep mode, during which energy is not transferred to accessory 550 via the inductive link. The time between the beginning of a first power transfer interval 664a and the beginning of the subsequent power transfer interval is the cycle time T_cycle. The duration of a power transfer interval is the on time T_on, i.e., the time during which rectifier 552 is switching and/or the time during which regulator 553 is drawing power from wireless power transfer coil 551. The off time T_off, corresponding to the duration of the sleep mode, is the difference between the cycle time T_cycle and the on time T_on.

Timing diagram 662 corresponds to a moderate load condition of accessory 550. In this condition power transfer intervals 664d and 664e are further apart, corresponding to a longer cycle time. Timing diagram 663 corresponds to a light load condition of accessory 550. In this condition power transfer interval 664f occurs, and the cycle time T_cycle is much longer, such that the subsequent power transfer interval is not visible on the scale of the diagram. In the illustrated examples, T_on for power transfer intervals 664d, 664e, and 664f is the same as in timing diagram 661, and the off times, or durations of the sleep modes are longer to provide the increased cycle time T_cycle. However, in some embodiments described below, on time T_on could be of variable length, i.e., adaptive. Additionally or alternatively, the off time T_off could be controlled by alternative techniques. In a first technique, the off time may be held constant. In a second technique, accessory 550 may send a burst mode request pulse to trigger the powering device as needed. These control techniques are described in greater detail below.

To provide adaptive control of the on time T_on, various system operating objectives may considered. For example, it may be desirable during the power transfer interval 664, it may be desired that energy storage device 554 be fully charged. When energy storage device 554 reaches a fully charged, its charging current will drop relatively quickly, which also corresponds to a decrease in power required by the wireless power transfer circuitry providing the power (e.g., WPT circuitry 542 in the configuration of FIGS. 5A and 5C or WPT circuitry 562 in the configuration of FIG. 5B). This allows for the power transmitting device, either personal electronic device 540 in the configuration of FIGS. 5A and 5C or the power accessory 560 in the configuration of FIG. 5B, to monitor the power delivered by its wireless power transfer circuitry 542/562 to detect when energy storage device 554 of accessory 550 has been fully charged. The power transmitting device to terminate wireless power transfer when energy storage device 554/accessory 550 has been fully charged.

Figure 7:
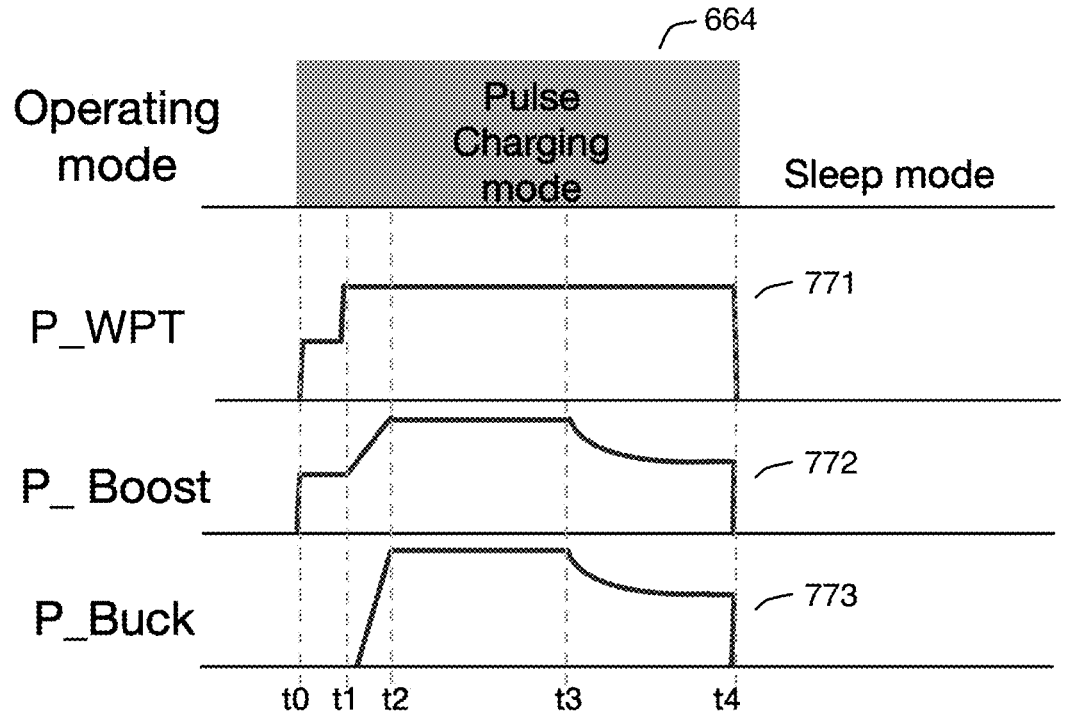
FIG. 7 illustrates power versus time curves for an example pulse charging mode with adaptive T_on control.

FIG. 7 illustrates exemplary power versus time curves for various components of a wireless power transfer system as described above employing adaptive T_on control. Curve 771 depicts the power versus time for the wireless power transfer circuitry 542/562 of the power transmitting device. Curve 772 depicts the power of the regulator supplying the wireless power transfer circuitry 542/562, e.g., boost converter/regulator 543/563. Curve 773 depicts the power delivered by buck charger/LDO 553 of accessory 550. During power transfer interval 664, the wireless power transfer circuitry 542/562 of the power transmitting device 540/560 is active. The beginning of this state may be triggered at time t0 upon expiration of the time out interval for the preceding sleep mode. Thus, at time to, the power transmitting device's wireless power transfer circuitry 542/562 begins to run, and the output of the regulator that powers such circuitry, e.g., boost converter 543/563, will begin to increase. At time t1, the inverter of WPT circuitry 542/562 can begin to run, and the output of buck charger/LDO 553 can begin to ramp up. At time t2, buck charger/LDO 553 reaches maximum power for the highest rate of charging of energy storage device 554. At time t3, energy storage device 554 reaches its maximum charge state, and the charging current (and correspondingly the power) begin to ramp down, reflected in both curves 772 and 773. At time t4, the power transmitting device can stop its wireless power transfer circuitry when the power drops below a predetermined level, triggering the beginning of the sleep mode. This cycle can repeat upon expiration of the off time, which may be determined according to one of the techniques described below.

Figure 8:
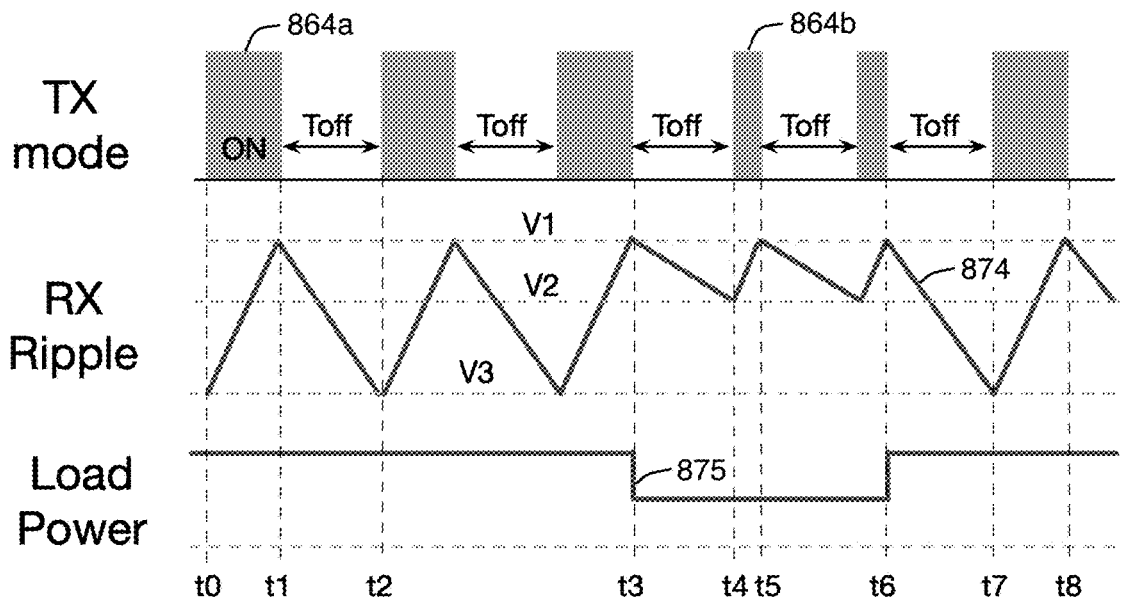
FIG. 8 illustrates plots of burst or pulsed wireless power transfer with corresponding plots of receiver ripple voltage and load power delivered.

A first technique for determining the off time T_off, i.e., the duration of the sleep mode between power transfer intervals 664 is to use a constant off time. The constant off time may be selected so that the minimum state of charge/voltage of accessory energy storage device 554 remains above a critical value (e.g., brownout value) that would disable system 555. This may be achieved in a variety of ways. For example, accessory 550 may provide pertinent parameters of its design to personal electronic device 540 via a communications channel, such as the illustrated NFC/Bluetooth communication channel. Such parameters could relate to power consumption of the accessory device, including, for example, full load power level, a default off time during full load, operating mode, etc. From this information, personal electronic device 540 may select or set a suitable fixed off time that will provide the guarantees described above. This way of determining the off time is only one example, and various other techniques could also be used. In any case, once the fixed off time is determined, the power transmitting device can power up and charge energy storage device 554 as described above with respect to FIG. 7. Further, the power transmitting device may stop transferring power when the power drops below the predetermined threshold, corresponding to energy storage device 554 reaching a full state of charge. FIG. 8 illustrates load power and receiver ripple voltage for such a system. The power transmitting device can then wait for the determined fixed off time T_off to initiate the next charging cycle.

FIG. 8 illustrates the constant T_off operating mode for two exemplary load levels of accessory 550. With reference to load power plot 875, the average accessory load is at a relatively higher level from time t0 until time t3, and which point the average load decreases to a relatively lower level until time t6, at which point it again increases. Corresponding power transfer intervals 864a and 864b are also illustrated. During the higher average power periods, the duration of power transfer intervals 864a is relatively longer, corresponding to the adaptive T_on control technique described above. During the lower average power periods, the duration of power transfer intervals 864b is relatively shorter, again corresponding to the adaptive T_on control technique described above. In all cases, the power transfer intervals are separated by sleep modes having a fixed duration T_off, selected as described above.

Plot 874 of FIG. 8 depicts the ripple voltage experienced by accessory 550 as a result of this operation. For example, this may be the voltage of energy storage device 554, which also corresponds to its state of charge. Beginning at time t0, when the accessory is experiencing the higher average load, energy storage device 554 is in a relatively lower state of charge, corresponding to a relatively lower voltage V3. Operation of power transfer window 864a serves to charge energy storage device 554, increasing its state of charge until it reaches a full charge state, which corresponds to voltage V3 at time t1. At this time, the power transmitting device enters a sleep mode for the fixed duration T_off. As a result, the state of charge and corresponding voltage decrease. At time t2, determined by the fixed T_off duration, a subsequent power transfer interval begins, bringing the state of charge of energy storage device 554 back up to a fully charged state, corresponding to voltage V1, at which point a subsequent fixed duration sleep state is entered.

At time t3, which happens to but need not occur at the beginning of a sleep state, the average load of accessory 550 decreases. The fixed off time (T_off) of this sleep state remains the same, but at time t4, when the next power transfer interval 864b begins, it takes relatively less time (until t5) to fully charge energy storage device 554 because it entered power transfer interval 864b in a relatively higher state of charge corresponding to a voltage V2. This corresponds to a shorter on time, as described above. Nonetheless, the off time T_off remains fixed during this relatively lower load interval. At time t6, when the average load of accessory 550 again increases, the system adapts by increasing the on time of the power transfer intervals, while holding the off time constant.

The above-described constant off time has the advantage of simplicity, as it requires no express feedback path between accessory 550 and the powering device, although in some embodiments and initialization communication channel may be provided to allow the power transmitting device to select a suitable fixed off time. However, one potential disadvantage of the constant off time control technique can be the increased ripple voltage experienced by accessory 550 during relatively higher load conditions. This can be alleviated by employing of a burst request pulse control technique between accessory 550 and the power transmitting device, in which the accessory device can send a request for the power transmitting device to initiate a power transfer interval when needed, although this requires a feedback channel to receive the pulses, which can be the power transfer channel, as illustrated in FIG. 9.

Figure 9:
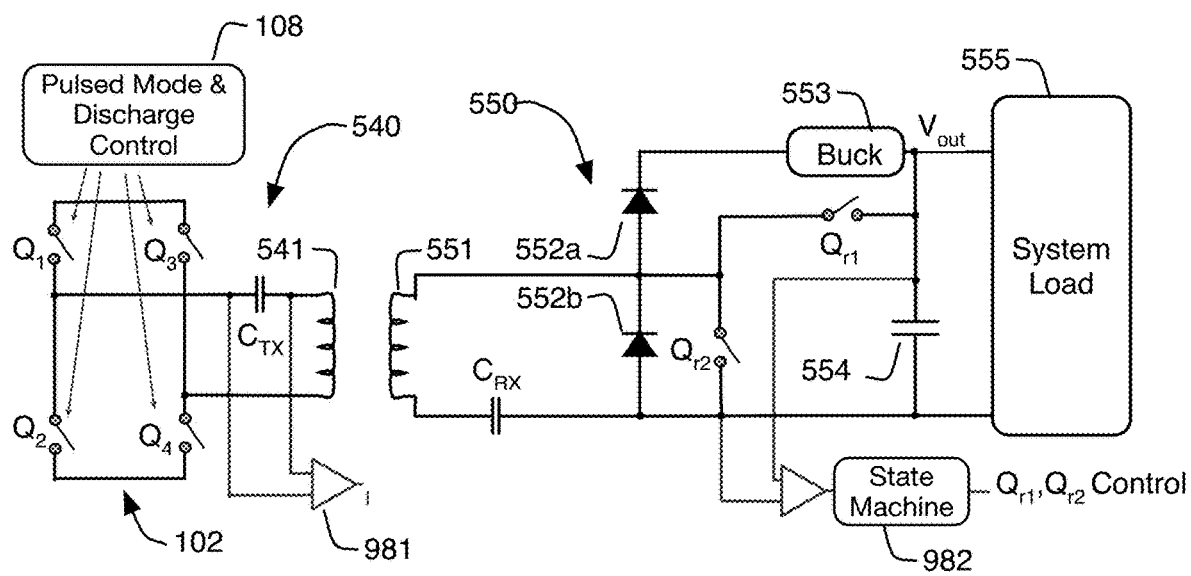
FIG. 9 illustrates a simplified schematic of a burst mode request pulse wireless power receiving accessory.

FIG. 9 illustrates a simplified schematic of a burst mode request pulse wireless power receiving accessory 550, together with power transmitting device 540. Power transmitting device 540 may be a personal electronic device 540 or, in some embodiments, could be a power accessory 560. FIG. 9 illustrates the power transmitting device in a conceptually similar way, but simplified way, as PTx 103 was depicted above in FIG. 1. More specifically, the depiction of the wireless power transfer circuitry is slightly expanded to show inverter 102 made up of switching devices Q1-Q4, with control circuitry 108, wireless power transfer coil 541, tuning capacitor CTX, and burst mode detection circuitry 981, described in greater detail below. Similarly, accessory 550 is depicted in a way conceptually similar, but simplified, as PRx 105 was depicted in FIG. 1. More specifically, diode rectifier 552 is expanded to show rectifier diodes 552a and 552b, energy storage device 554 is shown as a (super-)capacitor, and burst mode request circuitry including switches Qr1, Qr2, and state machine 982 are added.

Burst request mode pulses and various apparatus and methods of their use are described in greater detail in Applicant's co-pending U.S. patent application Ser. No. 17/386,542, entitled "Efficient Wireless Power Transfer Control," filed Jul. 28, 2021 and 63/216,831, entitled "Wireless Power Transfer with Integrated Communications," filed Jun. 30, 2021, which are incorporated by reference in their entirety. For purposes of the present disclosure, such circuitry may be distilled down to burst request mode pulse generation circuitry 982 located in accessory 550 and burst request mode pulse detection circuitry 981, located in wireless power transmitting device 540. Burst request mode pulse generation circuitry 982 may include any suitable circuitry that monitors Vout/the voltage of energy storage device 554, which corresponds to its state of charge. When this voltage is above a threshold corresponding to a brownout threshold, the system can be in a wait state. When this voltage reaches the threshold/critical level, circuitry 982 can transition to a state in which the receiver LC tank is short circuited to discharge capacitor CRX, for example, using switch Qr2. Subsequently, circuitry 982 can transition to a state in which the receiver LC tank is connected directly to Vout/energy storage device 554. This sequence can be repeated until the output voltage Vout rises above the critical threshold, resulting in a series of burst request mode pulses being sent over the power transfer channel via the magnetic coupling between accessory wireless power transfer coil 551 and power transmitting device wireless power transfer coil 541.

On the transmitter side, burst request mode pulse detection circuitry 981 may be configured to monitor the voltage across capacitor CTX of the transmitter side LC tank (as shown) or to monitor the voltage across wireless power transfer coil 541. In either case, the switching operations of switches Qr1 and Qr2 result in a series of characteristic pulses that may be detected by circuitry 981 and provided to wireless power transmitter control circuitry 108 to cause wireless power transfer circuitry 542 to initiate a power transfer interval 664, which can be done repeatedly so long as burst request mode pulses are being received, i.e., until energy storage device 554 and the corresponding voltage Vout are above the brownout threshold.

Figure 10:
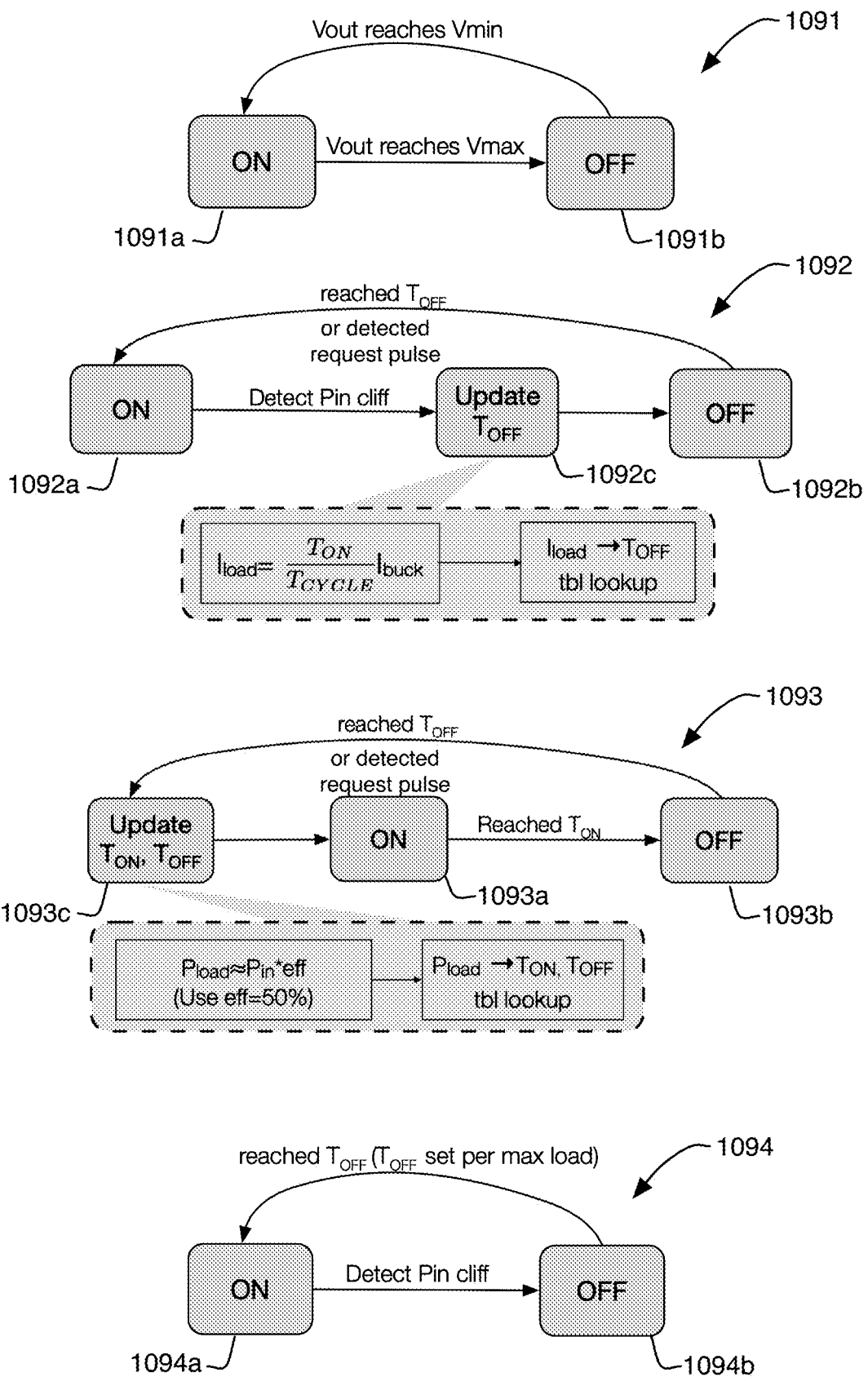
FIG. 10 illustrates simplified state diagrams corresponding to various wireless power transfer control techniques.

FIG. 10 illustrates a series of simplified state diagrams 1091-94 corresponding to various wireless power transfer control techniques for powering an accessory 550 from a wireless power transfer device 540/560, including a configuration in which the accessory is taking from an otherwise established wireless power transfer channel. These various techniques incorporate various combinations of the on time and off time control techniques described above with reference to FIGS. 6-9. State diagram 1091 corresponds to an "ideal" situation in which the power transmitter "knows" when the Vout (FIG. 9) reaches the critical threshold (Vmin) and based on this transitions from the off state 1091b (corresponding to the off time/sleep mode described above) to the on state 1091a (corresponding to the on time/power transfer interval 664). Then when Vout reaches Vmax (which, again, the power transmitter "knows"), the power transmitter transitions from on state 1091a back to off state 1091b. The transmitter knowledge in this case may be achieved through some sort of feedback channel based on either in-band communication or a separate communications channel, examples of which were described above.

State diagram 1092 corresponds to a first control technique based on a burst request mode pulse and power cliff detection technique. The "power cliff" in this case is the decrease in power through the wireless power transfer channel caused by energy storage device 554 reaching its full state of charge. Detecting this Pin (power in) cliff can cause a transition from on state 1092a to an 'update Toff' state 1092c in which the off time may be updated. In one update technique, the average load current can be determined, e.g., using the duty cycle of on time versus sleep mode, and this load current may be used to derive a maximum off time, e.g., from a lookup table. These operations may be performed by either the accessory itself or by the power transmitting device. If performed by the accessory, it can communicate the maximum off time to power transmitting device using an available communication channel. If the determination is made by the wireless power transmitting device, it can update its own control circuitry as appropriate. In either case, after Toff is updated (if necessary), the system can transition to off state 1092b. Then when the determined Toff is reached or if a burst mode request pulse is received, the power transmitting device can transition back to on state 1092a.

State diagram 1093 corresponds to a second control technique based on a burst request mode pulse and an input power estimation. Beginning with on state 1093a, when the predetermined on time Ton is reached, the power transmitting device can transition to the off state 1093b. Then when either a predetermined off time Toff is reached or a burst mode request pulse is received, the power transmitting device can transition to the update Ton, Toff state 1093c. In this state, the "instantaneous" load power can be determined from any suitable estimation mechanism employed by power transmitting device 540 or accessory 550. The determined power level can then be used to derive a suitable on time Ton and off time Toff from a lookup table. These values can then be provided to the wireless power transmitter device, which also transitions to the on state 1093a.

State diagram 1094 correspond to the adaptive T_on technique described with respect to FIG. 7 and the fixed T_off technique described above with reference to FIG. 8. Beginning with the on state 1094a, the power transmitting device can detect the input power (Pin) "cliff" associated with energy storage device 554 reaching a full charge state. This can trigger a transition to the off state 1094b corresponding to the sleep mode between power transfer intervals 664. Then, after a fixed off time Toff, corresponding to the duration of the sleep state and which may be determined based on the maximum load of accessory 550, the power transmitting device can transition back to the on state 1094a.

The foregoing describes exemplary embodiments of pulsed or burst mode wireless power transfer. Such systems may be used in a variety of applications but may be particularly advantageous when used in conjunction with wireless power transfer systems personal electronic devices such as a mobile phones, smart watches, and/or tablet computers and accessories for such devices such as wireless earphones, styluses, charging cases, and the like. However, a wide variety of wireless power transfer systems may advantageously employ the techniques described herein. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A wireless power transfer system comprising:
    an electronic device including a first wireless power transfer coil and wireless power transfer circuitry coupled to the wireless power transfer coil, wherein the wireless power transfer circuitry is configured to receive power and transmit power wirelessly via the first wireless power transfer coil; and
    an accessory device including a second wireless power transfer coil, a rectifier coupled to the second wireless power transfer coil, and an energy storage device coupled to the rectifier by a regulator circuit;
    wherein the wireless power transfer circuitry operates in a pulsed or burst wireless power transfer mode to deliver power to the accessory device, the pulsed or burst wireless power transfer mode having an on time during which power is delivered to the accessory device and an off time during which power is not delivered to the accessory device.

2. The wireless power transfer system of claim 1 wherein the wireless power transfer circuitry employs a variable on time, wherein the on time is terminated in response to the wireless power transfer circuitry detecting that the energy storage device is fully charged.

3. The wireless power transfer system of claim 2 wherein the wireless power transfer circuitry detects that the energy storage device is fully charged by monitoring an amount of wireless power delivered to the accessory device.

4. The wireless power transfer system of claim 2 wherein the wireless power transfer circuitry operates in the pulsed or burst wireless power transfer mode using a constant off time.

5. The wireless power transfer system of claim 4 wherein the constant off time is determined by the electronic device responsive to information received from the accessory device relating to power consumption of the accessory device.

6. The wireless power transfer system of claim 5 wherein the information received from the accessory device is received via a communication channel separate from the wireless power transfer channel.

7. The wireless power transfer system of claim 2 wherein the wireless power transfer circuitry operates in the pulsed or burst wireless power transfer mode using a variable off time.

8. The wireless power transfer system of claim 7 wherein the variable off time is terminated by a burst mode request pulse from the accessory device.

9. The wireless power transfer system of claim 1 further comprising a power accessory having a third wireless power transfer coil, the power accessory also receiving power from the electronic device, with the second wireless power transfer coil of the accessory device being positioned between the first wireless power transfer coil of the electronic device and the third wireless power transfer coil of the power accessory.

10. The wireless power transfer system of claim 9 wherein the power accessory is capable of delivering power to the electronic device and the accessory device via the third wireless power transfer coil.

11. An electronic device comprising:
a wireless power transfer coil; and
wireless power transfer circuitry coupled to the wireless power transfer coil, wherein the wireless power transfer circuitry is configured to receive power and transmit power wirelessly via the first wireless power transfer coil,
wherein the wireless power transfer circuitry operates in a pulsed or burst wireless power transfer mode to deliver power wirelessly to an accessory device, the pulsed or burst wireless power transfer mode having an on time during which power is delivered to the accessory device and an off time during which power is not delivered to the accessory device.

12. The electronic device of claim 11 wherein the wireless power transfer circuitry employs a variable on time, wherein the on time is terminated in response to the wireless power transfer circuitry detecting a decrease in power delivered to the accessory device.

13. The electronic device of claim 12 wherein the decrease in power delivered to the accessory devices is associated with an energy storage device of the accessory device reaching a full charge state.

14. The electronic device of claim 11 wherein the wireless power transfer circuitry operates in the pulsed or burst wireless power transfer mode using a constant off time.

15. The electronic device of claim 14 wherein the constant off time is determined by the electronic device responsive to information received from the accessory device relating to power consumption of the accessory device.

16. The electronic device of claim 15 wherein the information received from the accessory device is received via a communication channel separate from the wireless power transfer channel.

17. The electronic device of claim 11 wherein the wireless power transfer circuitry operates in the pulsed or burst wireless power transfer mode using a variable off time.

18. The electronic device of claim 17 wherein the variable off time is terminated by a burst mode request pulse from the accessory device.

* * * * *